US006582171B2

(12) United States Patent
Bondarowicz et al.

(10) Patent No.: US 6,582,171 B2
(45) Date of Patent: *Jun. 24, 2003

(54) CAPTIVE FASTENER MEMBER AND SYSTEM

(75) Inventors: Frank A. Bondarowicz, Park Ridge, IL (US); William G. Stlaske, Chicago, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/967,168

(22) Filed: Sep. 28, 2001

(65) Prior Publication Data

US 2002/0009351 A1 Jan. 24, 2002

Related U.S. Application Data

(63) Continuation-in-part of application No. 09/593,654, filed on Jun. 13, 2000, now Pat. No. 6,379,093.

(51) Int. Cl.[7] .................................................. F16B 21/18
(52) U.S. Cl. ........................ 411/353; 411/525; 411/999
(58) Field of Search ................................ 411/107, 999, 411/353, 521, 525, 526, 529

(56) References Cited

U.S. PATENT DOCUMENTS

| | | | |
|---|---|---|---|
| 2,244,975 A | | 6/1941 | Tinnerman |
| 2,420,826 A | | 5/1947 | Irrgang |
| 2,492,115 A | | 12/1949 | Crowther |
| 2,667,200 A | * | 1/1954 | Bedford |
| 2,672,659 A | | 3/1954 | Becker |
| 2,709,470 A | * | 5/1955 | Knohl |
| 3,027,670 A | | 4/1962 | Kramer |
| 3,156,281 A | * | 11/1964 | Demi |
| 3,226,145 A | | 12/1965 | Goldberg |
| 3,394,747 A | | 7/1968 | Duffy |
| 3,414,154 A | * | 12/1968 | Rose |
| 3,437,199 A | | 4/1969 | Jacobson |
| 3,474,847 A | * | 10/1969 | Bedford |
| 3,764,957 A | * | 10/1973 | Iversen |
| 4,248,131 A | | 2/1981 | Larro |
| 4,615,655 A | | 10/1986 | Dixon |
| 4,732,519 A | | 3/1988 | Wagner |
| 4,952,107 A | | 8/1990 | Dupree |
| 5,082,407 A | | 1/1992 | Mickiewicz |
| 5,290,132 A | * | 3/1994 | Gnage |
| 5,395,194 A | | 3/1995 | Johnson et al. |
| 5,531,554 A | | 7/1996 | Jeanson et al. |
| 5,645,282 A | | 7/1997 | Belter |
| 6,079,920 A | * | 6/2000 | Dispenza |
| 6,379,093 B1 | * | 4/2002 | Bondarowicz |

* cited by examiner

*Primary Examiner*—Flemming Saether
(74) *Attorney, Agent, or Firm*—Mark W. Croll; Paul F. Donovan

(57) ABSTRACT

A fastener system having a fastener and a fastener retention member is provided. The fastener includes a threaded portion, a head, and a shank portion extending therebetween. The threaded portion includes threads having a major diameter greater than a diameter of the shank portion. The fastener retention member includes a body member having an axial opening therethrough, and at least one shank engagement member protruding into the axial opening of the body member. The shank engagement members define a diameter smaller than the major diameter of the threads of the threaded portion of the fastener. The shank portion of the fastener is received in the axial opening of the fastener retention member and is axially movable therein and trapped between a position where the head of the fastener abuts the fastener retention member and a position where the threaded portion of the fastener engages the shank engagement members.

16 Claims, 3 Drawing Sheets

US 6,582,171 B2

CAPTIVE FASTENER MEMBER AND SYSTEM

CROSS REFERENCE TO RELATED APPLICATION

This application is a continuation-in-part application of U.S. Co-Pending application Ser. No. 09/593,654 filed on Jun. 13, 2000, now U.S. Pat. No. 6,379,093.

FIELD OF THE INVENTION

The present invention relates generally to fastening systems, and more particularly to pre-assembled fastener retention members and fasteners.

BACKGROUND OF THE INVENTION

It is known generally to pre-assemble a fastener in the bore of a work piece prior to mounting the work piece on a mounting surface.

U.S. Pat. No. 5,395,194 entitled "Convoluted Bolt Retainer," for example, discloses a polymeric retainer having a thin wall annular body member comprising an alternate arrangement of arcuate ribs and ears about a central opening. The polymeric retainer is pre-assembled into a stepped bore in a structural member and is retained therein by elastic deformation of the retainer walls. The elastic body member retains a bolt shaft disposed in the opening thereof prior to mounting of the structural member on a mounting surface.

A disadvantage of this design, however, is that a special stepped bore is required in the structural member. As such, the retainer cannot be used with structures having conventional holes. An additional disadvantage is that fasteners constructed in accordance with the design do not adequately retain the fastener in the structure, and they have a tendency to become dislodged during shipment.

U.S. Pat. No. 6,174,118 entitled "Movable Retention Device For A Threaded Fastener," discloses a threaded fastener retention device which includes a housing having a retainer aperture formed therein and tab retainers adjacent the aperture. A resilient retainer is movably mounted in the aperture. The retainer includes a body having tabs for engaging the tab retainers and fastener gripping members for engaging the threads of the fastener and retaining the fastener in the housing.

A disadvantage of this design, however, is that the retainer requires a specifically designed retainer aperture formed in a housing. The retainer cannot be effectively used in conjunction with a conventional hole. A further disadvantage of the design is that the fastener is not readily axially displaceable within the aperture. Instead, the threads of the fastener engage the fastener gripping members such that axial displacement is only possible by either turning the fastener such that the threads drive the fastener axially, or by forcing the fastener axially, thereby deforming the fastener gripping members.

While it is true that in some applications it is desirable that the fastener be held axially in position, such as, for example, in a situation where it is desirable that a leading end of the fastener shaft does not extend beyond a sealing surface of a first work piece prior to mounting thereof on the mounting surface of a second work piece, such is not always the case. For example, packaging restraints may become an issue if the captured fastener assemblies are mechanically locked in an upward position, as upward clearance may not be available. Moreover, the need for fasteners to locate blind holes prior to bolt-down while allowing minimal risk of damaging (i.e., pitting or scratching) the mounting surface further makes desirable a readily axially retractable design.

What is desired, therefore, is a fastener system which overcomes problems in and improves upon the prior art, which is reliable and economical, which may be pre-assembled with standard a fastener without modification to the fastener, which may be retained in the bore of a work piece without modification of the work piece, which allows the fastener shaft to be retracted within an opening of a work piece, while also allowing for axial movement of the fastener shaft within the opening, and which compensates for misalignment between first and second openings in corresponding work pieces to be mounted together.

SUMMARY OF THE INVENTION

Accordingly, it is an object of the present invention to provide a fastener system which overcome problems in and improve upon the prior art.

Another object of the present invention is to provide a fastener system having the above characteristics and which is reliable and economical.

A further object of the present invention is to provide a fastener system having the above characteristics and which may be pre-assembled with standard a fastener without modification to the fastener.

Still another object of the present invention is to provide a fastener system having the above characteristics and which may be retained in the bore of a work piece without modification of the work piece.

Yet a further object of the present invention is to provide a fastener system having the above characteristics and which allows the fastener shaft to be retracted within an opening of a work piece, while also allowing for axial movement of the fastener shaft within the opening.

Still yet a further object of the present invention is to provide a fastener system having the above characteristics and which compensates for misalignment between first and second openings in corresponding work pieces to be mounted together.

These and other objects of the present invention are achieved by provision of a fastener system having a fastener and a fastener retention member. The fastener includes a threaded portion, a head, and a shank portion extending therebetween. The threaded portion includes threads having a major diameter greater than a diameter of the shank portion. The fastener retention member includes a body member having an axial opening therethrough, and at least one shank engagement member protruding into the axial opening of the body member. The shank engagement members define a diameter smaller than the major diameter of the threads of the threaded portion of the fastener. The shank portion of the fastener is received in the axial opening of the fastener retention member and is axially movable therein and trapped between a position where the head of the fastener abuts the fastener retention member and a position where the threaded portion of the fastener engages the shank engagement members.

Preferably, the fastener retention member is adapted to be received in an opening of a work piece, and the fastener retention member includes at least one work piece engagement member protruding outwardly from the axial opening of the body member. Most preferably, the at least one shank engagement member comprises three shank engagement members, and the at least one work piece engagement member comprises three work piece engagement members.

It is also most preferable if the fastener retention member is a unitary metal member.

It is also preferable that the fastener retention member also includes a flange protruding outwardly from the axial opening of the body member. Most preferably, the flange comprises three flange portions.

In one embodiment, the at least one shank engagement member loosely engages the shank portion of the fastener so as to allow for uninhibited axial relative movement between the fastener and the fastener retention member. In another embodiment, the at least one shank engagement member frictionally engages the shank portion of the fastener such that while axial movement is readily accomplished, there is some resistance thereto.

Moreover, it should be understood that the degree of axial movement between the fastener and the fastener retention member is dependent upon a length of the shank portion of the fastener.

The invention and its particular features and advantages will become more apparent from the following detailed description considered with reference to the accompanying drawings.

DETAILED DESCRIPTION OF THE INVENTION

Figure 1:
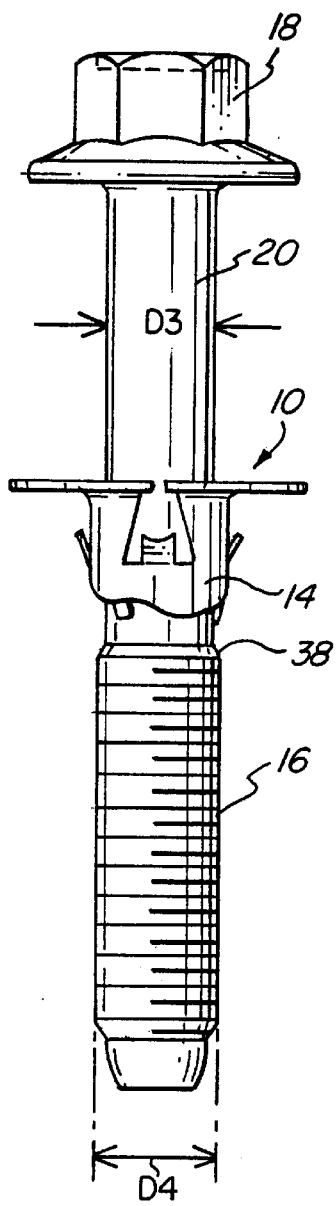
FIG. 1 is a side view of a fastener system in accordance with an exemplary embodiment of the invention.

Referring first to FIG. 1, a fastener system 10 in accordance with the present invention is shown prior to mounting within a work piece. The fastener system 10 includes a fastener 12 and a fastener retention member 14. Fastener 12, which may comprise a bolt, a screw, or the like, includes a threaded portion 16, a head 18, and an shank portion 20 therebetween.

Figure 2:
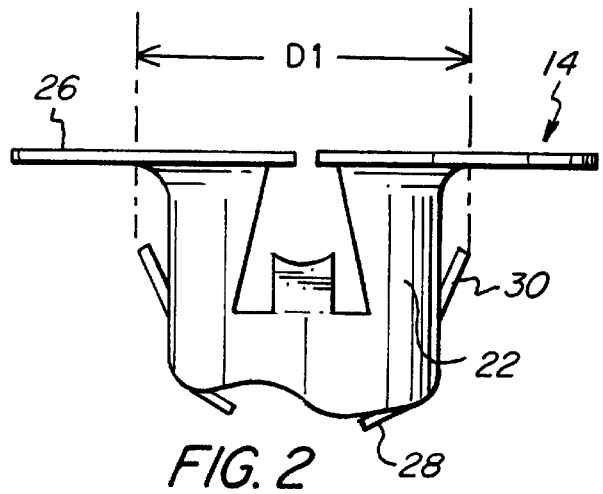
FIG. 2 is an enlarged side view of a fastener retention member of the fastener system of FIG. 1.
Figure 3:
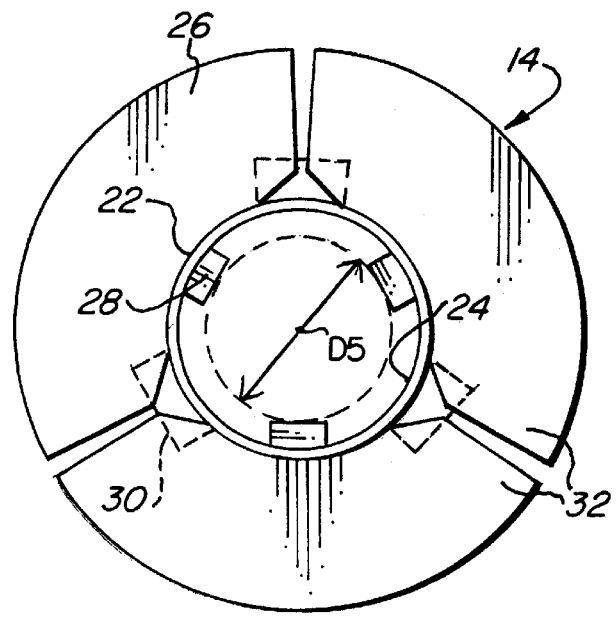
FIG. 3 is a top view of the fastener retention member of FIG. 2.

Referring now to FIGS. 2 and 3, fastener retention member 14 is shown in more detail. Fastener retention member 14 generally comprises a body member 22 having an axial opening 24 therethrough for accommodating fastener 12, a flange 26 protruding outwardly from the axial opening 24 of the body member 22, at least one shank engagement member 28 protruding into the axial opening 24 of the body member 22, and at least one work piece engagement member 30 protruding outwardly from the axial opening 24 of the body member 22.

In FIGS. 2 and 3, the exemplary flange 26 comprises a plurality of discrete portions 32 extending generally radially outwardly from an end of the body member 22, but in other embodiments the flange may be a non-discrete or continuous annular member.

Figure 4A:
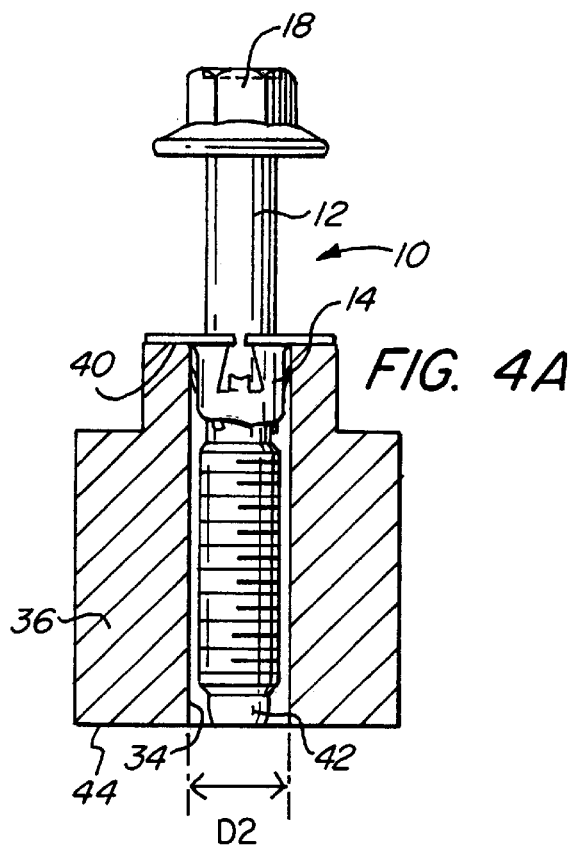
FIGS. 4A–4C are side views of the fastener system of FIG. 1 installed in a work piece and illustrating axial movement of a fastener within the fastener retention member.
Figure 4B:
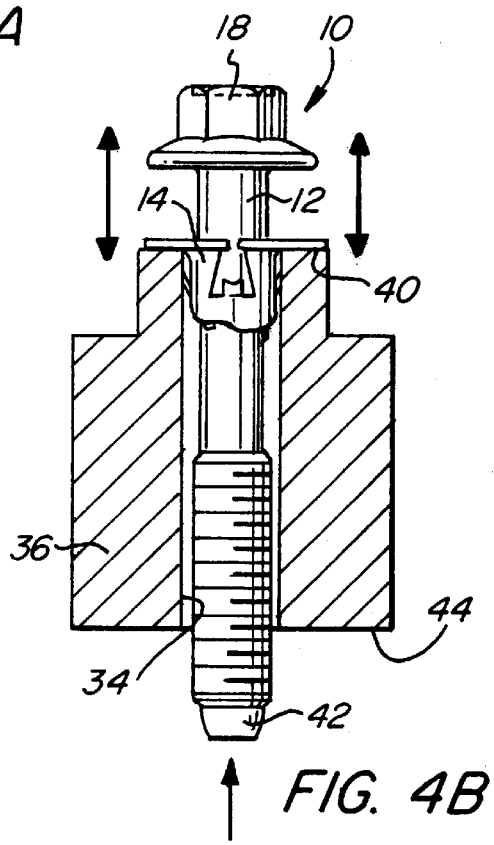
Figure 4C:
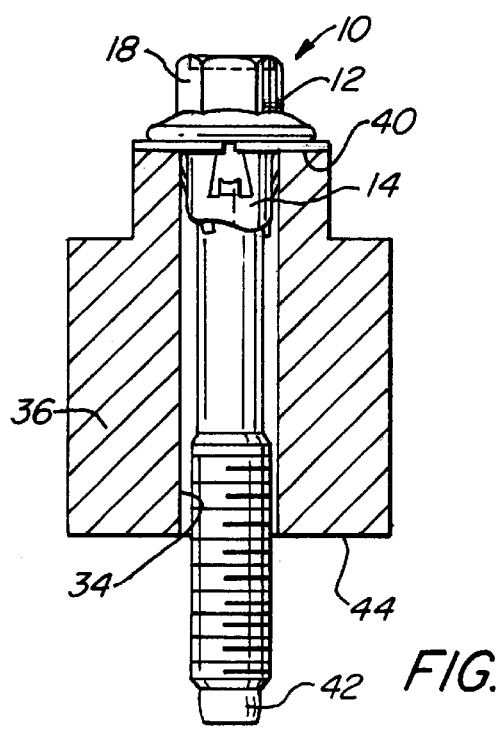

Referring now to FIGS. 4A through 4C, fastener system 10 is shown in an assembled position with fastener retention member 14 retaining fastener 12 in an opening or bore 34 through a work piece 36 prior to mounting the work piece 36 onto a mounting surface of another work piece, as discussed below. The work piece 36 may, for example, be an oil pan or a cover member, and the mounting surface may be an engine block.

Returning again to FIGS. 2 and 3, the diameter of the flange 26 or portions 32 thereof is greater than the diameter of the work piece opening 34. The flange 26 limits the extent to which the fastener retention member 14 may be axially disposed into the work piece opening 34, and is preferably sufficiently large to provide support and permit lateral movement of the fastener retention member 14 in the opening 34. In some applications, the flange 26 may help support the body member 22 of fastener retention member 14 in the opening 34, and may provide a mounting surface for head portion 18 of the fastener 12, as illustrated in FIG. 4C.

In the exemplary embodiment of FIG. 3, the at least one shank engagement member 28 comprises three distinct tabs protruding into the axial opening 24 of the body member 22 for locating and retaining the fastener 12 therein, as described in more detail below. In other embodiments, there may be more or less than three shank engagement members 28.

In the exemplary embodiment of FIG. 3, the at least one work piece engagement member 30 comprises three resilient work piece engagement tabs protruding outwardly from the axial opening 24 of the body member 22. Other embodiments may include more or less work piece engagement members 30.

A portion of each work piece resilient engagement member 30 extends outwardly to a diameter D1 beyond the diameter D2 of the work piece opening 34 prior to insertion of the body member 22 therein. As best seen in FIG. 2, the resilient engagement members 30 preferably extend toward the flange 26, thereby facilitating insertion of the body member 22 into the work piece opening 34.

The fastener retention member 14 is preferably a unitary metal member formed, for example, in a stamping operation.

In some applications, the fastener retention member 14 is pre-assembled with a threaded fastener 12, and the assembly is subsequently installed into the opening 34 of a work piece 36. In other applications, the fastener retention member 14 is installed in opening 34 without the fastener 12, and the fastener is installed at a later time.

To assemble the fastener retention member 14 and the threaded fastener 12, the fastener 12 is generally inserted into the body member opening 24 and axially positioned relative thereto. The threaded fastener 12 may be screwed into the retention member opening 24 upon threaded engagement with shank engagement members 28 thereof configured for mating screw thread engagement therewith. Alternatively, the fastener 12 may merely be driven forcefully through the opening 24 against the frictional engagement of the shank engagement members 28, depending on configuration of the shank engagement members 28 and preferences of the assembler.

The shank portion 20 of fastener 12 above its threaded portion 16 has a diameter D3 less than that of the major diameter D4 of threaded portion 16. As the shank engagement members 28 snap past, or are screwed past, threaded portion 16, the top thread 38 of threaded portion 16 prevents the fastener retention member 14 and the fastener 12 from being separated, since the top thread 38, like the remainder of threaded portion 16 has a diameter D4 larger than a diameter D5 defined by shank engagement members 28. Thus, fastener retention member 14 is trapped on shank portion 20 of fastener 12 between head 18 and threaded portion 16 thereof.

It may be desirable for the shank engagement members 28 to loosely engage shank portion 20 of fastener 12 so as to allow for completely uninhibited axial relative movement between fastener 12 and fastener retention member 14. In other applications, it may be desirable for shank engagement members 28 to engage shank portion 20 of fastener 12 with a slight frictional interference, so that while axial movement is readily accomplished, there is some resistance to such. This may be beneficial, for example, in a situation where a large captured bolt may have a tendency to fall out of the work piece after installation by hammering itself loose if the bolt slides freely back and forth during vibrations or the like.

The engagement between the fastener retention member 14 and fastener 12 disposed in the opening 24 thereof depends generally upon the frictional engagement therebetween, which is determined largely by the configuration of the shank engagement members 28 and the properties of the material from which the fastener retention member 14 is fabricated.

Referring now again to FIGS. 4A through 4C, fastener retention member 14 is generally disposed in the work piece opening 34, with or without the fastener 12. During insertion, the resilient work piece engagement members 30, which extend radially beyond the diameter of the work piece opening 34 prior to installation, are flexed inwardly against their bias upon engagement with the wall portion of the work piece opening 34. The flange 26 of the fastener retention member 14 engages a surface 40 of the work piece 36 to limit insertion of body member 22 therein. Thereafter, the resilient work piece engagement members 30 are urged outwardly against the work piece opening 34 to locate and axially retain the body member 22 therein.

The engagement between the fastener retention member 14 and the work piece opening 34 depends generally upon the frictional engagement therebetween, which is determined largely by the configuration of the work piece engagement members 30 and the properties of the material from which the fastener retention member 14 is fabricated.

Once fastener system 10 is mounted within opening 34 in work piece 36, it may be desirable for fastener 12 to be disposed such that a leading end 42 of the fastener 12 does not extend beyond a second surface 44 of the work piece 36, as illustrated in FIG. 4A. However, as set forth above, it may be desirable for fastener 12 to be axially moveable within the opening 34. The fastener system 10 of the present invention allows for such axial movement (indicated by arrows in FIG. 4B) from the position shown in FIG. 4A where leading end 42 of the fastener 12 does not extend beyond a second surface 44 of the work piece 36, to the position shown in FIG. 4C, where head 18 of fastener 12 abuts flange 26 of fastener retention member 14.

As will be appreciated by FIGS. 4A through 4C, the degree to which fastener 12 is axially movable within opening 34 is a factor of the length of shank portion 20 of fastener 12, and it is not required to modify fastener retention member 14 in any way. This allows for convenient accommodation of work pieces of various thicknesses.

Figure 5:
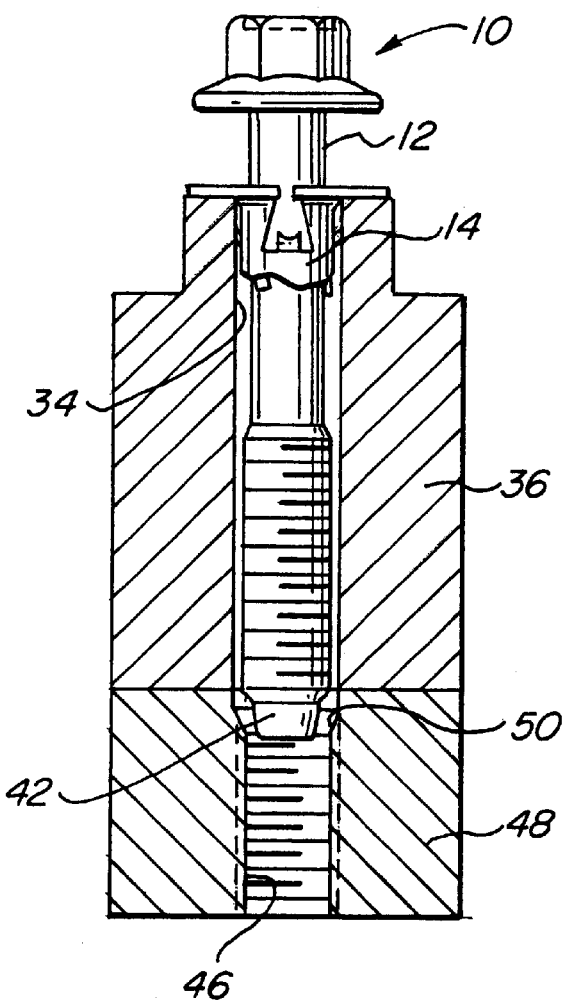
FIG. 5 is a side view of the fastener system of FIG. 1 installed in a work piece and illustrating the attachment of one work piece to a second work piece.

Referring now to FIG. 5, the resilient nature of the work piece engagement members 30 permits the fastener retention member 14 to float radially in the opening 34 of work piece 36, thereby facilitating alignment of the fastener 12 with an opening 46 in a second work piece 48 prior to insertion of the fastener 12 into the opening 46. This is particularly true when opening 46 in second work piece 48 includes a counterbore or chamfer 50.

Alignment is also facilitated by the axially moveable relationship between fastener 12 and fastener retention member 14. As will be appreciated, work piece 36 and work piece 48 can be slid relative to each other with only slight pressure on fastener 12 until leading end 42 of fastener 12 is aligned with opening 46. At this point, fastener will move slightly into hole 46, and fastener 12 can be screwed therein. Such is not possible if fastener 12 is not readily axially movable. If fastener 12 were arranged such leading end 42 of the fastener 12 was axially fixed in a position not extending beyond second surface 44 of the work piece 36, there would be no indication when fastener 12 was aligned with opening 46. If fastener 12 were arranged such leading end 42 of the fastener 12 was axially fixed in a position extending beyond second surface 44 of the work piece 36, damage (i.e., pitting or scratching) could easily occur when work piece 36 and work piece 48 were slid relative to each other. The present invention obviates these problems.

Figure 6:
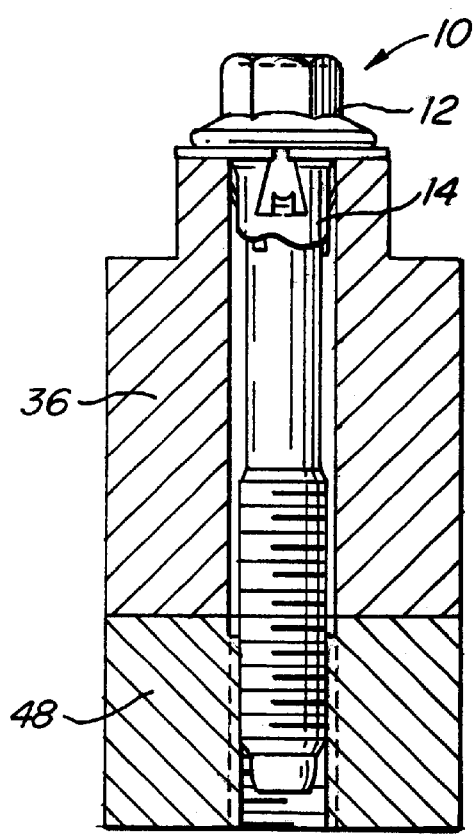
FIG. 6 is a side view of the fastener system of FIG. 1 attaching two work pieces together.

Referring now to FIG. 6, work piece 36 and work piece 48 are shown in the fully assembled position, held tightly together by a fastener system 10 in accordance with the present invention.

The present invention, therefore, provides a fastener system which overcomes problems in and improves upon the prior art, which is reliable and economical, which may be pre-assembled with standard a fastener without modification to the fastener, which may be retained in the bore of a work piece without modification of the work piece, which allows the fastener shaft to be retracted within an opening of a work piece, while also allowing for axial movement of the fastener shaft within the opening, and which compensates for misalignment between first and second openings in corresponding work pieces to be mounted together.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A fastener system comprising:
   a fastener, said fastener having a threaded portion, a head, and a shank portion extending therebetween, the threaded portion having threads having a major diameter greater than a diameter of the shank portion;
   a fastener retention member, said fastener retention member having a body member having an axial opening therethrough, a flange protruding outwardly from the axial opening of the body member, and at least one shank engagement member protruding from the body member into the axial opening of the body member, the at least one shank engagement member defining a diameter smaller than the major diameter of the threads of the threaded portion of said fastener; and
   said fastener retention member adapted to be received in an opening of a work piece, and having at least one work piece engagement member protruding outwardly from the body member;
   wherein the shank portion of said fastener is received in the axial opening of said fastener retention member and is axially movable therein and trapped between a position where the head of said fastener abuts said flange and a position where the threaded portion of said fastener engages the at least one shank engagement member.

2. The fastener system of claim 1 wherein the at least one shank engagement member comprises three shank engagement members.

3. The fastener system of claim 1 wherein the at least one work piece engagement member comprises three work piece engagement members.

4. The fastener system of claim 1 wherein the flange comprises three flange portions.

5. The fastener system of claim 1 wherein the at least one shank engagement member loosely engages the shank portion of said fastener so as to allow for uninhibited axial relative movement between said fastener and said fastener retention member.

6. The fastener system of claim 1 wherein the at least one shank engagement member frictionally engages the shank portion of said fastener such that while axial movement is readily accomplished, there is some resistance thereto.

7. The fastener system of claim 1 wherein the degree of axial movement between said fastener and said fastener retention member is dependent upon a length of the shank portion of said fastener.

8. The fastener system of claim 1 wherein said fastener retention member is a unitary metal member.

9. A fastener system adapted to be received in an opening of a work piece, said fastener system comprising:
- a fastener, said fastener having a threaded portion, a head, and a shank portion extending therebetween, the threaded portion having threads having a major diameter greater than a diameter of the shank portion;
- a fastener retention member, said fastener retention member having a body member having an axial opening therethrough, a flange protruding outwardly from the axial opening of the body member, a plurality of work piece engagement members protruding outwardly from the axial opening of the body member, and a plurality of shank engagement members protruding from the body member into the axial opening of the body member, the plurality of shank engagement members defining a diameter smaller than the major diameter of the threads of the threaded portion of said fastener; and
- wherein the shank portion of said fastener is received in the axial opening of said fastener retention member and is axially movable therein and trapped between a position where the head of said fastener abuts said flange and a position where the threaded portion of said fastener engages the plurality of shank engagement members.

10. The fastener system of claim 9 wherein the plurality of shank engagement member comprises three shank engagement members.

11. The fastener system of claim 9 wherein the plurality of work piece engagement members comprises three work piece engagement members.

12. The fastener system of claim 9 wherein the flange comprises three flange portions.

13. The fastener system of claim 9 wherein the plurality of shank engagement members loosely engage the shank portion of said fastener so as to allow for uninhibited axial relative movement between said fastener and said fastener retention member.

14. The fastener system of claim 9 wherein the plurality of shank engagement members frictionally engage the shank portion of said fastener such that while axial movement is readily accomplished, there is some resistance thereto.

15. The fastener system of claim 9 wherein the degree of axial movement between said fastener and said fastener retention member is dependent upon a length of the shank portion of said fastener.

16. The fastener system of claim 9 wherein said fastener retention member is a unitary metal member.

* * * * *